United States Patent
Nowak et al.

(10) Patent No.: US 11,940,033 B2
(45) Date of Patent: Mar. 26, 2024

(54) TWO PIECE PLASTIC DIRT SHIELD FOR SHOCK ABSORBERS

(71) Applicant: DRiV Automotive Inc., Southfield, MI (US)

(72) Inventors: Michal Andrzej Nowak, Ruda Slaska (PL); Tomasz Gorski, Laziska Gorne (PL); Jan Wojtowicz, Bobrowniki (PL); Mateusz Bibrzycki, Ruda Slaska (PL)

(73) Assignee: DRiV Automotive Inc., Northville, MI (US)

( * ) Notice: Subject to any disclaimer, the term of this patent is extended or adjusted under 35 U.S.C. 154(b) by 20 days.

(21) Appl. No.: 17/507,926

(22) Filed: Oct. 22, 2021

(65) Prior Publication Data
US 2023/0128428 A1    Apr. 27, 2023

(51) Int. Cl.
F16F 9/38    (2006.01)
F16F 9/19    (2006.01)

(52) U.S. Cl.
CPC ............ *F16F 9/38* (2013.01); *F16F 9/19* (2013.01); *F16F 2226/044* (2013.01); *F16F 2226/045* (2013.01); *F16F 2230/0005* (2013.01); *F16F 2230/0023* (2013.01)

(58) Field of Classification Search
CPC ........... F16F 9/38; F16F 2226/044; F16F 2230/0023; F16F 9/19; F16F 2226/045; F16F 2230/0005
See application file for complete search history.

(56) References Cited

U.S. PATENT DOCUMENTS

| | | | |
|---|---|---|---|
| 4,167,992 A | 9/1979 | McClellan | |
| 4,222,805 A | 9/1980 | Karklins et al. | |
| 9,127,742 B2 * | 9/2015 | Nowotka | F15B 15/1423 |
| 9,874,262 B2 | 1/2018 | Schimetka | |
| 2009/0050426 A1 | 2/2009 | Handke | |
| 2015/0060220 A1 * | 3/2015 | Takeo | F16F 9/19 |
| | | | 188/322.12 |
| 2015/0354657 A1 * | 12/2015 | Takeo | F16F 9/18 |
| | | | 188/322.12 |
| 2016/0341272 A1 * | 11/2016 | Kawabe | F16F 9/32 |
| 2017/0175841 A1 * | 6/2017 | Murata | F16F 9/19 |
| 2017/0276207 A1 | 9/2017 | Schimetka | |

FOREIGN PATENT DOCUMENTS

| | | | |
|---|---|---|---|
| CN | 204372033 U | 6/2015 | |
| DE | 102010028854 A1 * | 11/2011 | ............. B60G 11/27 |
| DE | 102017221591 A1 * | 12/2018 | ................ F16F 9/38 |
| EP | 2256365 A2 | 12/2010 | |

OTHER PUBLICATIONS

International Search Report and Written Opinion regarding International Application No. PCT/US2022/047115, dated Feb. 10, 2023.

* cited by examiner

*Primary Examiner* — Xuan Lan Nguyen
(74) *Attorney, Agent, or Firm* — Harness, Dickey & Pierce, P.L.C.

(57) ABSTRACT

A dirt shield for shock absorbers having a piston assembly and a cylinder member with a metal dirt shield cap connected to a rod of the piston assembly. A plastic dirt shield bracket is adapted to be fixed to the metal dirt shield cap and includes a first portion and a second portion hingedly connected to one another. A dirt shield tube is connected to the plastic dirt shield bracket.

6 Claims, 4 Drawing Sheets

TWO PIECE PLASTIC DIRT SHIELD FOR SHOCK ABSORBERS

FIELD

The present disclosure relates to a two-piece plastic dirt shield for shock absorbers.

BACKGROUND

This section provides background information related to the present disclosure which is not necessarily prior art.

Shock absorbers absorb excitations imparted on a vehicle axle system originating from the road. They ensure permanent road grip of the wheels and thus good braking effects. Shock absorbers are essential for driving safety and ride comfort. A typical shock absorber includes a cylinder attached to a vehicle structure such as an axle and a piston assembly including a piston disposed within the cylinder and a rod attached to the piston and to a vehicle body or frame member. Dirt shields have been commonly used to prevent contamination within the shock absorber and to protect the piston rod and oil seal against any damage. The typical material for current truck and bus shock absorber dirt shields is metal.

SUMMARY

This section provides a general summary of the disclosure, and is not a comprehensive disclosure of its full scope or all of its features.

A dirt shield is provided for shock absorbers having a piston assembly and a cylinder member with a metal dirt cap connected to a rod of the piston assembly. A plastic dirt shield bracket is adapted to be fixed to the metal dirt cap and includes a first portion and a second portion hingedly connected to one another. A dirt shield tube is connected to the plastic dirt shield bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
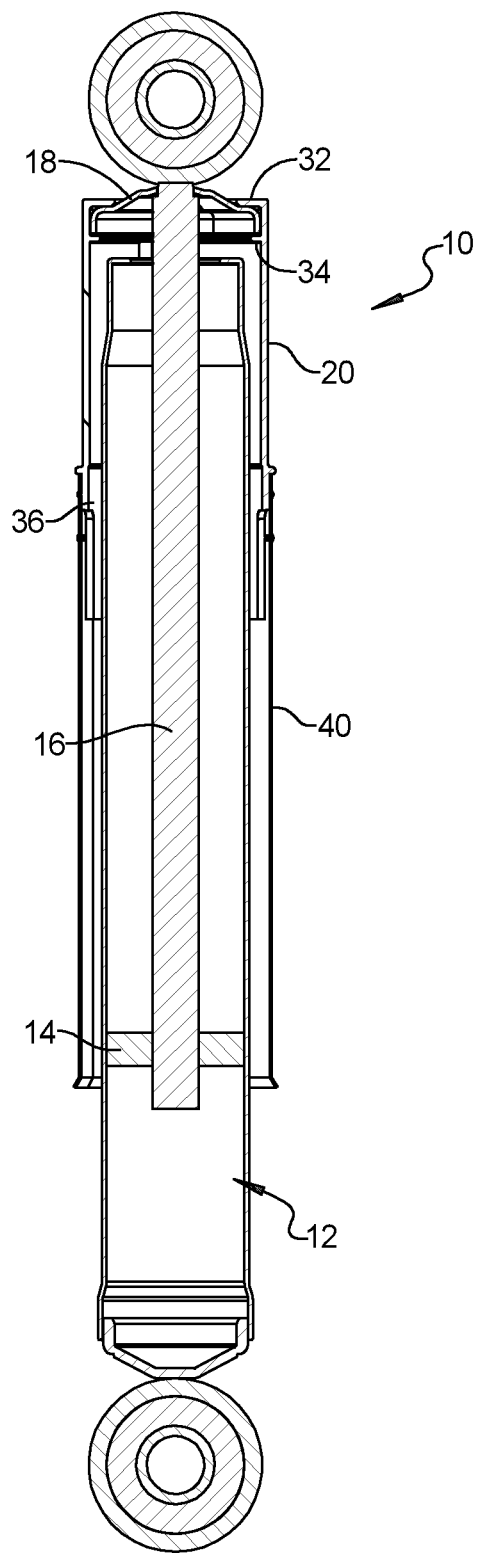
FIG. 1 is a schematic view of an shock absorber assembly with a dirt shield according to the principles of the present disclosure.
Figure 3:
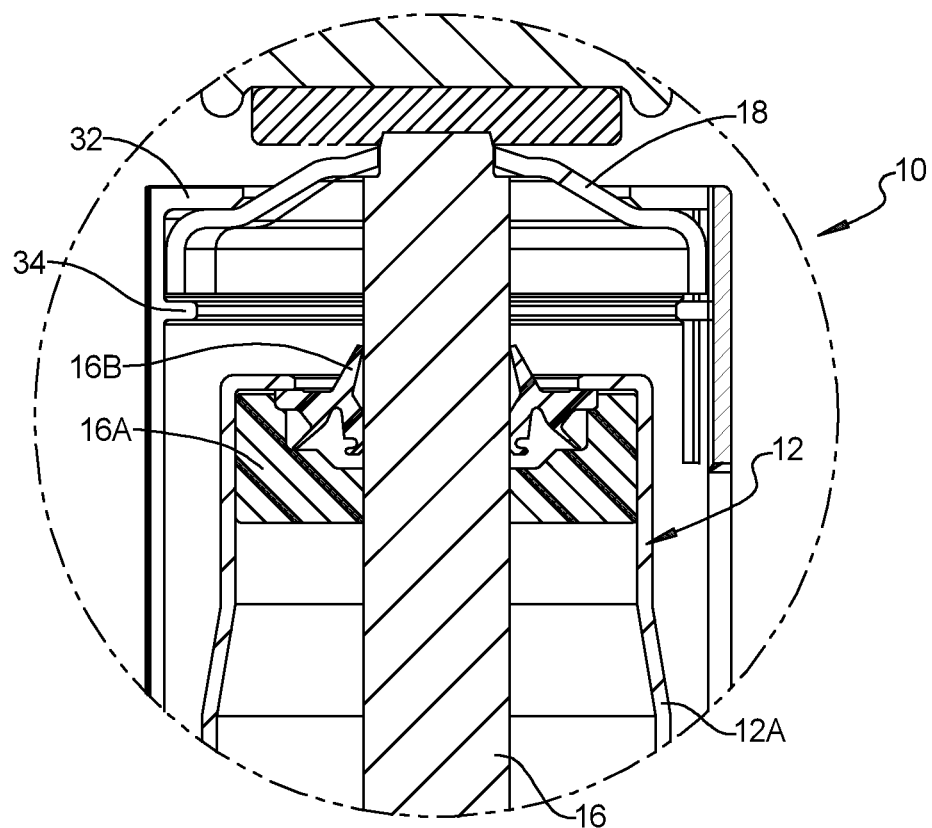
FIG. 3 is a partial cross-sectional view showing the plastic dirt shield bracket engaged to a metal dirt shield cap of the shock absorber according to the embodiment of FIG. 1.

With reference to FIG. 1, an shock absorber assembly 10 is schematically shown including a cylinder member 12 that is adapted to be mounted to a portion of a vehicle suspension system. A piston member 14 is received in the cylinder assembly 12 and is connected to a rod 16 extending out of the cylinder assembly 12 and adapted to be connected to a vehicle body or frame member. A dirt cap 18 is connected to the rod 16. As shown in FIG. 3, the cylinder assembly 12 can include a pressure tube (inner tube) 12A and a reserve tube (outer tube) 12B. The piston rod 16 can be supported by a rod guide 16A and a rod seal 16B.

Figure 2:
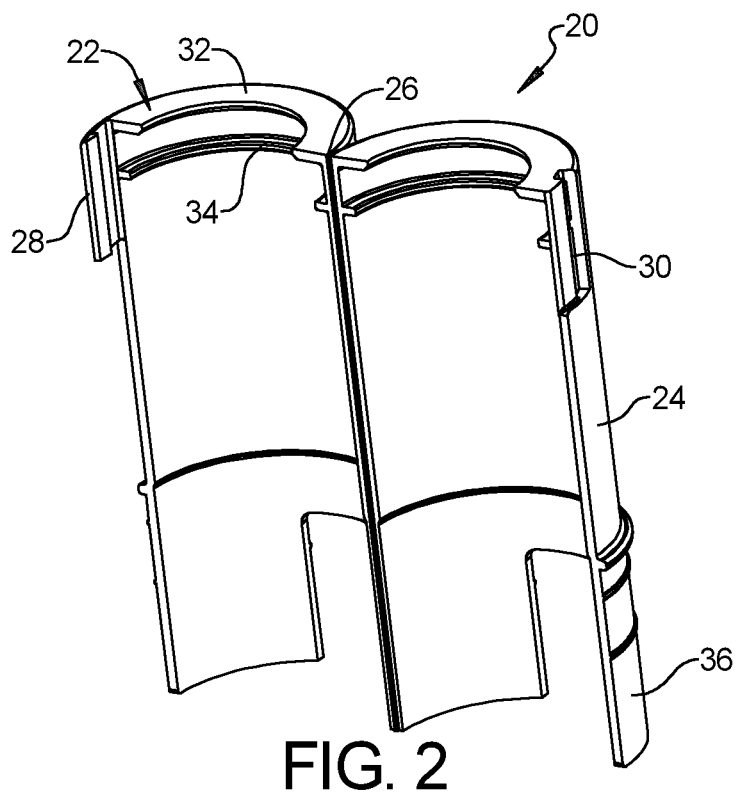
FIG. 2 is a perspective view of a plastic dirt shield bracket according to the embodiment of FIG. 1.

A plastic dirt shield bracket 20 is fixed to the metal dirt cap 18. As best shown in FIG. 2, the plastic dirt shield bracket 20 includes a first portion 22 connected to a second portion 24 by a living hinge 26. The first portion 22 of the dirt shield bracket 20 includes a latch member 28 that is adapted to engage a catch portion 30 of the second portion 24 of the dirt shield bracket 20 in order to secure the plastic dirt shield bracket 20 around the dirt cap 18, the rod 16 and the cylinder member 12. With reference to FIGS. 2 and 3, the first portion 22 and the second portion 24 of the plastic dirt shield bracket 20 each include a first radially inwardly extending flange 32 and a second inwardly extending flange 34 that are adapted to receive the metal dirt shield cap 18 therebetween. The plastic dirt shield bracket 20 can have a cylindrical configuration in its assembled condition. The plastic dirt shield bracket 20 can have a reduced or enlarged diameter end section 36 at one end thereof opposite the first and second inwardly extending flanges 32, 34.

Figure 4:
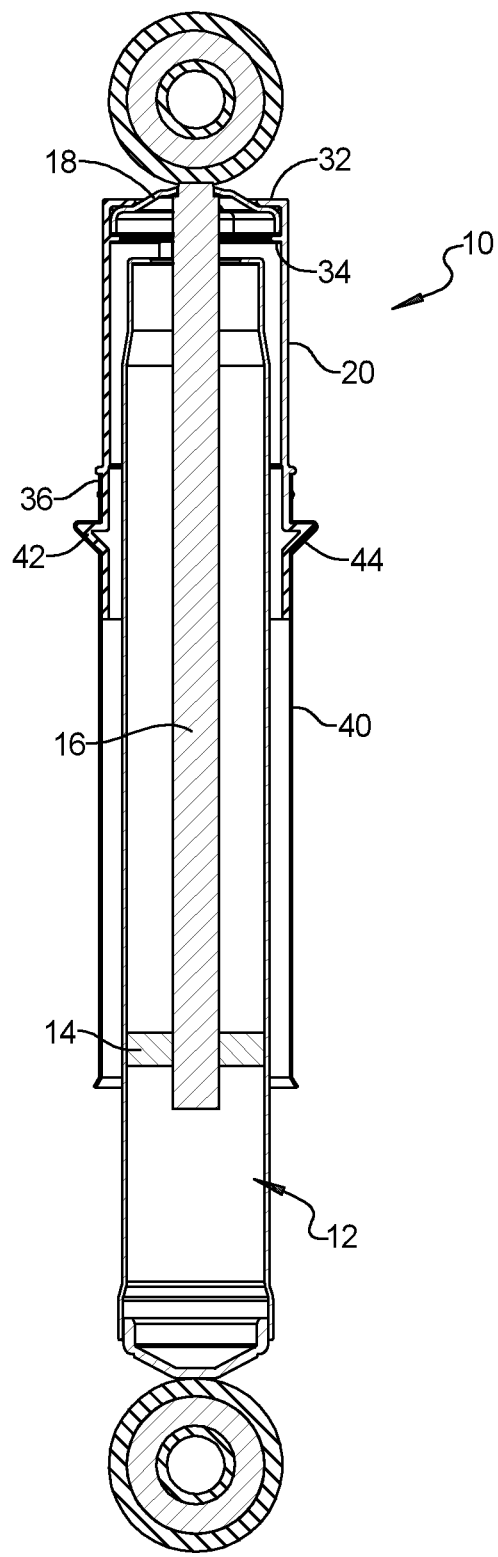
FIG. 4 is a schematic view of an shock absorber assembly with a dirt shield according to an alternative embodiment.

With reference to FIG. 1, a dirt shield tube 40 is connected to the end section 36 of the plastic dirt shield bracket 20. The dirt shield tube 40 can include an interior diameter that is press fit with the end section 36. Alternatively, as shown in FIG. 4, one or the dirt shield bracket 20 and the dirt shield tube 40 can include a raised rib 42 for a snap fit engagement with a recess 44 in the other of the dirt shield bracket 20 and the dirt shield tube 40. The dirt shield tube 40 can extend overtop of the cylinder member 12 and its length can be selected based upon the desired application. The dirt shield tube 40 can be made from plastic or metal and can assist in holding the plastic dirt shield bracket 20 in a secure position around the axle damper assembly 10. A diameter of the plastic dirt shield bracket 20 and the dirt shield tube 40 can be selected depending upon the size of the cylinder member 12 and the shock absorber mounting loop and based upon the desired application.

Figure 5:
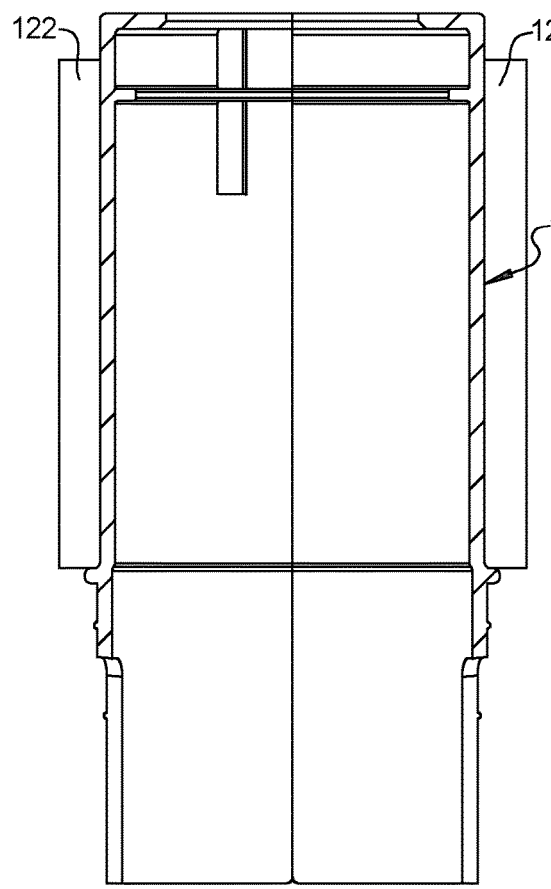
FIG. 5 is a schematic view of a plastic dirt shield bracket according to an alternative embodiment.
Figure 6:
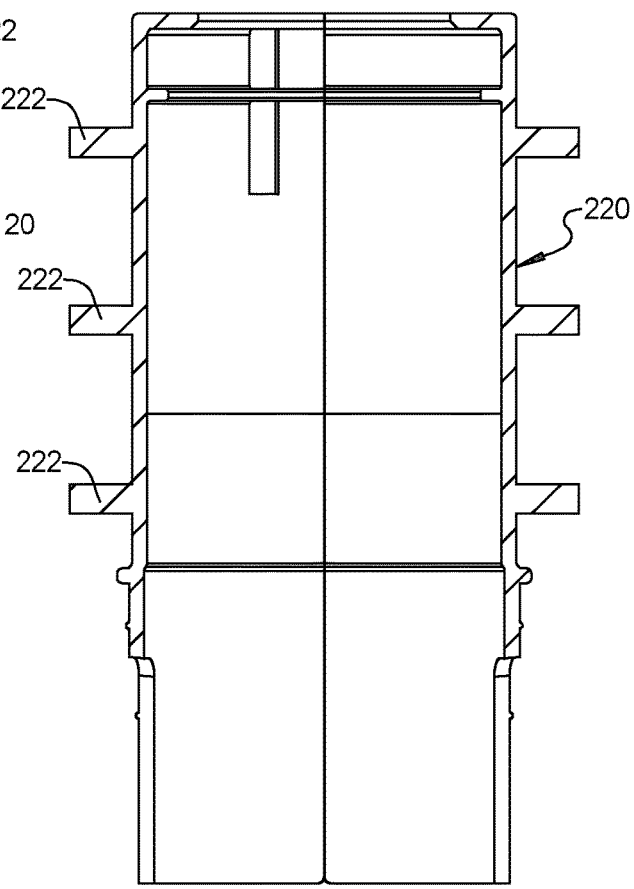
FIG. 6 is a schematic view of a plastic dirt shield bracket according to an alternative embodiment.

As shown in FIG. 5, the dirt shield bracket 120 can include axially extending strengthening ribs 122 in order to improve the bracket stiffness. Alternatively, as shown in FIG. 6, the dirt shield bracket 220 can include annular strengthening ribs 222.

As shown in FIG. 1, the dirt shield bracket 20 can optionally include a radially inwardly extending alignment structure that engages the rod 16 and aligns the dirt shield bracket 20 and prevents its possible tilting.

The present disclosure provides a two-piece plastic dirt shield including the plastic dirt shield bracket 20 is closed around the dirt shield cap 18 and secured by the latch member 28 engaging the catch portion 30 to provide a stiff/robust connection. The bottom of the plastic dirt shield bracket 20 is designed to receive the dirt shield tube 40 which can be press fit or snap fit onto the plastic dirt shield bracket 20 to allow for an easily formed and assembled dirt shield assembly 20/40 with an appropriate length. The design provides for reduced weight and cost by using plastic instead of metal and requires no painting of the plastic dirt shield assembly 20/40. In addition, the proposed plastic design eliminates the need for welding with the dirt shield cap and provides a corrosion resistant dirt shield assembly.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber assembly, comprising:
a cylinder member;
a piston member received in the cylinder member and connected to a rod extending from the cylinder member and including a metal dirt shield cap connected to the rod, the metal dirt shield cap including a radially extending retainer portion engaging the rod and a cylindrical portion axially extending therefrom;
a plastic dirt shield bracket fixed to the metal dirt shield cap and having a first portion and a second portion hingedly connected to one another; and
a dirt shield tube connected to the plastic dirt shield bracket,
wherein the plastic dirt shield bracket includes a first radially inwardly extending flange positioned adjacent to the retainer portion and a second radially inwardly extending flange positioned adjacent to an end face of the cylindrical portion such that the metal dirt shield cap is received therebetween.

2. The shock absorber assembly according to claim 1, wherein the plastic dirt shield bracket includes an alignment structure that engages the rod and is axially spaced from the first radially inwardly extending flange and the second inwardly extending flange.

3. The shock absorber assembly according to claim 1, wherein the dirt shield tube is press fit on an outer surface of the plastic dirt shield bracket.

4. The shock absorber assembly according to claim 1, wherein the dirt shield tube is snap fit on the plastic dirt shield bracket.

5. The shock absorber assembly according to claim 1, wherein the plastic dirt shield bracket includes a latch member for securing the first portion and the second portion of the plastic dirt shield in a closed position.

6. The shock absorber assembly according to claim 1, wherein the plastic dirt shield bracket includes an inner cylindrical surface positioned adjacent to and circumscribing the cylindrical portion of the metal dirt shield cap.

* * * * *